US009057663B2

(12) United States Patent
Trump et al.

(10) Patent No.: US 9,057,663 B2
(45) Date of Patent: Jun. 16, 2015

(54) METHOD FOR IDENTIFYING THE START OF COMBUSTION IN A CYCLICALLY OPERATING INTERNAL COMBUSTION ENGINE IN WHICH A FUEL IS IGNITED BY A CORONA DISCHARGE

(71) Applicant: BorgWarner BERU systems GmbH, Ludwigsburg (DE)

(72) Inventors: Martin Trump, Munich (DE); Steffen Bohne, Freiburg (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 123 days.

(21) Appl. No.: 13/902,398

(22) Filed: May 24, 2013

(65) Prior Publication Data

US 2013/0319095 A1 Dec. 5, 2013

(30) Foreign Application Priority Data

May 30, 2012 (DE) .......................... 10 2012 104 641

(51) Int. Cl.
| | |
|---|---|
| *F02P 17/00* | (2006.01) |
| *G01M 15/04* | (2006.01) |
| *F02P 17/12* | (2006.01) |
| *F02P 23/04* | (2006.01) |

(52) U.S. Cl.
CPC ................ *G01M 15/04* (2013.01); *F02P 17/12* (2013.01); *F02P 23/04* (2013.01)

(58) Field of Classification Search
CPC ...... F02P 17/00; F02P 17/12; F02P 2017/121
USPC .............................. 73/114.58, 114.62, 114.66
See application file for complete search history.

(56) References Cited

U.S. PATENT DOCUMENTS

| | | | |
|---|---|---|---|
| 8,701,638 B2* | 4/2014 | Schremmer | ................... 123/606 |
| 2011/0114071 A1 | 5/2011 | Freen | |
| 2011/0203543 A1 | 8/2011 | Agneray et al. | |
| 2011/0253114 A1* | 10/2011 | Schremmer | ................... 123/606 |
| 2011/0305998 A1 | 12/2011 | Toedter et al. | |
| 2012/0173117 A1 | 7/2012 | Serizawa et al. | |

(Continued)

FOREIGN PATENT DOCUMENTS

| | | |
|---|---|---|
| DE | 10 2008 061 788 A1 | 6/2010 |
| DE | 10 2009 013 877 A1 | 9/2010 |

(Continued)

*Primary Examiner* — Eric S McCall
(74) *Attorney, Agent, or Firm* — Bose McKinney & Evans LLP

(57) ABSTRACT

The invention relates to a method for detecting the start of combustion in a cyclically operating internal combustion engine in which a fuel/air mixture is ignited by means of a corona discharge, wherein, to generate the corona discharge, an electrical resonant circuit is excited, in which an ignition electrode that is electrically insulated with respect to combustion chamber walls constitutes a capacitor together with the combustion chamber walls, and, to identify the start of combustion, an electrical variable of the resonant circuit is evaluated. The position of an extremum is evaluated, the extremum occurring in the course of the electrical variable after ignition of the corona discharge and before extinguishment thereof, or the course of the electrical variable is compared with a reference course, wherein a threshold value is predefined and fuel combustion is concluded on the basis of a deviation by more than the threshold value.

12 Claims, 2 Drawing Sheets

(56) References Cited

U.S. PATENT DOCUMENTS

| | | | |
|---|---|---|---|
| 2012/0192825 A1* | 8/2012 | Trump | 123/143 R |
| 2012/0260898 A1* | 10/2012 | Schremmer | 123/598 |
| 2013/0199508 A1* | 8/2013 | Toedter et al. | 123/594 |
| 2013/0319384 A1* | 12/2013 | Trump et al. | 123/623 |
| 2013/0325302 A1* | 12/2013 | Trump et al. | 701/111 |

FOREIGN PATENT DOCUMENTS

| | | |
|---|---|---|
| DE | 10 2009 055 862 A1 | 6/2011 |
| FR | 2 934 942 A1 | 2/2010 |
| JP | 2011 064 162 A | 3/2011 |
| WO | WO 2010/011838 A1 | 1/2010 |

* cited by examiner

METHOD FOR IDENTIFYING THE START OF COMBUSTION IN A CYCLICALLY OPERATING INTERNAL COMBUSTION ENGINE IN WHICH A FUEL IS IGNITED BY A CORONA DISCHARGE

RELATED APPLICATIONS

This application claims priority to DE 10 2012 104 641.7, filed May 30, 2012, which is hereby incorporated by reference in its entirety.

BACKGROUND

The invention relates to a method for identifying the start of combustion in a cyclically operating internal combustion engine in which a fuel/air mixture is ignited by means of a corona discharge.

Ignition devices with which a fuel/air mixture is ignited by a corona discharge comprise an electrical resonant circuit, in which an ignition electrode that is electrically insulated with respect to combustion chamber walls constitutes a capacitor together with the combustion chamber walls. By exciting the resonant circuit, a corona discharge can be generated at the ignition electrode and then ignites the fuel/air mixture contained in the combustion chamber. Such a corona ignition device is described for example in WO 2010/011838. The content of the combustion chamber is the dielectric of the capacitor formed by the ignition electrode and the combustion chamber walls. Electrical variables of the resonant circuit of a corona ignition device are therefore particularly suitable for obtaining information regarding the combustion chamber and a fuel combustion process taking place therein.

SUMMARY

The present invention provides a way in which the start of combustion can be identified.

With a method according to this disclosure, the position of an extremum is evaluated, said extremum occurring in the course of the electrical variable after ignition of the corona discharge and before extinguishment thereof. The start of the combustion process specifically leads to a drastic change in the conditions present in the combustion chamber. The start of combustion is therefore linked with an extremum in the course of various electrical variables of the resonant circuit of a corona discharge device. Thus it is possible to find out when combustion has started. The time at which combustion starts is important information for effective motor control. The time at which combustion starts may be given as an angle that the crankshaft has at that time.

The electrical variable of the resonant circuit may be, for example, the resonance frequency of the resonant circuit, the impedance of the resonant circuit, or the phase between current and voltage. The extremum associated with the start of the combustion process is a maximum or a minimum depending on which variable is considered.

When a corona discharge is produced, there is initially a rise in the resonance frequency of the resonant circuit. As a result of the formation of the corona discharge, the resonance frequency then falls, since pre-reactions occur and the ionization of the fuel/air mixture increases. As soon as the fuel/air mixture ignites, the resonance frequency rises. The course of the impedance of the resonant circuit of a corona discharge device accordingly initially displays a minimum and, at the start of combustion, a maximum.

The corona discharge is generally ignited again in each cycle of the engine. It is, however, also possible to allow the corona discharge to burn during the entire cycle, that is to say to ignite the corona discharge only when starting the engine. It is also possible to allow a reduced voltage to burn as a diagnosis voltage during the entire cycle and to apply the full ignition voltage only to ignite a corona discharge. In particular in this case, the time window to be examined with the method according to this disclosure can be limited by predefined crankshaft angles. The extremum caused by the start of combustion can thus be found and evaluated more easily.

The start of the fuel combustion can therefore be identified at an extremum in the course of the electrical variable, for example the resonance frequency of the resonant circuit, the impedance of the resonant circuit or the phase between current and voltage. The position of an extremum can be determined and evaluated directly at the course of the examined electrical variable, or indirectly on the basis of extrema of the time derivative.

For example with frequency-controlled resonant circuits, especially closed-loop frequency-controlled resonant circuits, the resonance frequency can be examined as an electrical variable in a method according to this disclosure in order to detect the start of combustion. With frequency-controlled resonant circuits, for example with phase-locked loops, the phase position between current and voltage is particularly well suited.

Extrema may additionally occur between the start of the corona discharge and the start of the combustion process as a result of noise or interfering pulses. In particular, the ignition of a corona discharge is often associated with disturbing effects and additional extrema, since the resonant circuit of the corona discharge device often does not resonate in a stable manner at this moment in time. It may therefore be appropriate with the method according to this disclosure to only evaluate the course of the examined electrical variable from a predefined interval after the first extremum. For example, the position of an extremum that occurs in the course of the electrical variable at a predefined minimum interval after the ignition of the corona discharge may be evaluated in order to establish the start of combustion. Earlier extrema can remain unconsidered, since some time passes before a corona discharge has introduced enough energy into the fuel/air mixture for said mixture to ignite.

For example, with the occurrence of a number of extrema after the ignition of the corona discharge, it is possible to check whether these extrema observe a predefined minimum interval from the ignition point of the corona discharge. Extrema that do not observe this predefined minimum interval can remain unconsidered in the further evaluation. Another possibility is to only examine the course of the electrical variable from a minimum interval over time from the start of the corona discharge.

With very slow ignition, for example poorly ignitable mixtures, it may be that additional extrema occur before the start of the combustion process, since the compression of the fuel/air mixture in the combustion chamber may also lead to changes of the electrical variables of the resonant circuit. Additional extrema may also be produced by a knocking combustion. Such additional extrema are generally much weaker however compared to the extremum associated with the start of the combustion process and additionally only occur long after the start of combustion. If a number of extrema occur in the examined range, the evaluation can therefore be limited to global extrema, that is to say to the greatest maximum and/or the smallest minimum in the examined range. In other words, the start of combustion can be associated with the occurrence of a number of extrema between the ignition of the corona discharge and extinguishment thereof, that is to say with an extremum that is a global extremum. If the extremum is a maximum, for example of the impedance, the maximum belonging to the start of combustion therefore normally has a greater value than any maximum occurring previously or subsequently in the range to be examined. If the extremum is a minimum, for example of the resonance frequency, the minimum belonging to the start of combustion therefore normally has a smaller value than any minimum occurring previously in the range to be examined.

The extremum associated with the start of the combustion process is generally also characterised in that it is preceded by a pronounced extremum of the first derivative. The extremum associated with the start of the combustion process is typically preceded by a global extremum of the first derivative. Alternatively or additionally, the extremum that belongs to the start of the combustion process can therefore also be identified by evaluation of the first derivative. In other words, the start of combustion can thus be associated with the extremum preceded by an extremum of the first derivative, which is more strongly pronounced than the extrema of the first derivative, which are preceded by the other extrema of the electrical variable in the range to be evaluated.

Theoretically, it may be in very rare cases, for example due to measurement errors, that these two criteria deliver different results. It may therefore be advantageous to combine these two criteria, for example by quantifying the extent by which one extremum is more pronounced compared to other extrema. One possibility for this is to calculate a factor by which one extreme value deviates from the next most strongly pronounced extreme value, that is to say for example to establish the percentage by which the most strongly pronounced maximum exceeds the second greatest maximum or the percentage by which the value at the most strongly pronounced minimum falls below the second smallest minimum value. The criterion that characterises an extremum more clearly than the other criterion is then used to associate an extremum with the start of combustion.

If an extremum of the electrical variables thus deviates from the next most clearly pronounced extremum by a first factor, this first factor can be compared with a second factor by which an extremum of the first derivative deviates from another extremum of the first derivative. If the first factor is greater than the second factor, the first criterion, that is to say the criterion of the extremum of the electrical variable, is more clearly pronounced than the second criterion, that is to say the criterion of the derivative.

In accordance with an advantageous refinement of this disclosure, with the occurrence of a number of extrema, one extremum is therefore associated with the start of combustion under consideration of how strongly the extremum is pronounced and also under consideration of how strongly a preceding extremum of the first derivative is pronounced. In this case, the method can make use of both the subject of claim 6 and the subject of claim 7, since an extremum is sometimes associated with the start of combustion in accordance with claim 6 and an extremum is sometimes associated with the start of combustion in accordance with claim 7.

The start of combustion determined using a method according to this disclosure can be subject to fluctuations caused by measurement errors. A sliding average value of the start of combustion for a number of cycles of the internal combustion engine is therefore preferably calculated. This average value can be used for example by an engine control unit. The average value can be calculated for example over three or more cycles, preferably five or more cycles. A calculation over more than 10 cycles, in particular more than 20 cycles, is usually not associated with additional advantages.

The average value can also be used as an additional criterion for identifying the start of combustion, since the start of combustion cannot change only to a small extent from one cycle to the next. The average value can therefore be used to limit the range to be evaluated, in which the course of the electrical variable is examined. It is also possible to reject results that deviate from the average value by more than a predefined threshold value as incorrect. This threshold value can be predefined as a function of the standard deviation.

The present disclosure also relates to a method for establishing the start of combustion in a cyclically operating internal combustion engine in which a fuel/air mixture is ignited by means of a corona discharge, wherein, to generate the corona discharge, an electrical resonant circuit is excited, in which an ignition electrode that is electrically insulated with respect to combustion chamber walls constitutes a capacitor together with the combustion chamber walls, and, to establish the start of combustion, an electrical variable of the resonant circuit is evaluated, wherein the course of the electrical variable is compared with a reference course, for example a course averaged over a number of cycles, and wherein a threshold value is predefined and fuel combustion is concluded on the basis of a deviation by more than the threshold value.

The initial course of the electrical variables of the resonant circuit of a corona discharge device is generally not subject to any significant fluctuations and thus hardly differs from one cycle to another. Only with the start of combustion, which may occur at different moments in time, do significant differences appear between various cycles. By comparison with an averaged course, the start of combustion can therefore be established.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of the present invention.

Figure 1A:
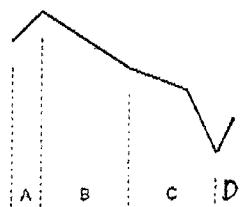
FIGS. 1*a*-1*c* show three schematic courses of the resonance frequency of the resonant circuit of a corona discharge device.

FIG. 1*a* shows a schematic illustration of the course of the resonance frequency f of the electrical resonant circuit of a corona discharge device with optimal combustion of rapidly ignitable mixtures. As can be seen, the resonance frequency f changes significantly over time t and therefore also with the crankshaft angle. The course, starting with a crankshaft angle of approximately 25° to 20° before the top dead center, as far as the top dead center is illustrated. Depending on the engine operation, ignition point and duration of the corona discharge may be slightly different. The abscissa is therefore not provided with units in the schematic illustration of the FIGS.

In region A in FIG. 1a, the transient state of the resonant circuit before the formation of a corona discharge is accompanied by a rise in the resonance frequency. The region A can be referred to as the tuning phase. In a subsequent region B, the corona discharge is formed and the resonance frequency falls. In the region B, pre-reactions and a starting ionization of the fuel/air mixture occur as a result of the formation of the corona discharge. This fall in frequency continues in a subsequent region C, in which there is increasing ionization of the fuel/air mixture. At the end of the region C, the fuel/air mixture ignites, and the fuel combustion starts. The region C is adjoined by a region D, in which the resonance frequency rises during the combustion process or can rise due to disconnection processes. The resonance frequency has a minimum between the regions C and D. This minimum is generally a global minimum.

Figure 2A:
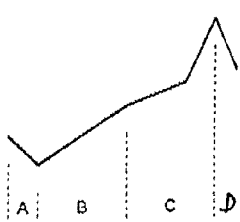
FIGS. 2*a*-2*c* show three schematic courses of the impedance of the resonant circuit of a corona discharge device.

FIG. 2a shows accordingly how the impedance Z of the resonant circuit of a corona discharge device changes over time t with ideal fuel combustion. A comparison of FIGS. 1a and 2a shows that a minimum of the impedance Z corresponds to a maximum of the resonance frequency f, and a minimum of the resonance frequency corresponds to a maximum of the impedance.

Figure 1B:
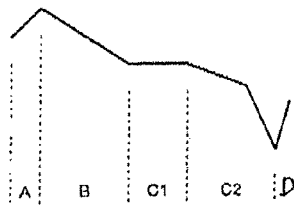
Figure 2B:
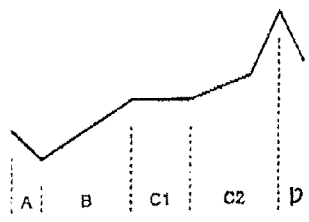

FIG. 1b schematically shows how the resonance frequency f of the electrical resonant circuit of a corona discharge device changes over time t with a delayed ignition. The regions A and B at most differ insignificantly from the regions A and B with ideal combustion, for which the course of the resonance frequency is sketched in FIG. 1a. A region C1, in which the resonance frequency is practically constant, adjoins the region B. Only in a region C2 is there then an increasingly sharp fall in the resonance frequency and ignition of the fuel/air mixture. FIG. 2b accordingly shows how the impedance Z of the resonant circuit of a corona discharge device changes over time t in this case.

Figure 1C:
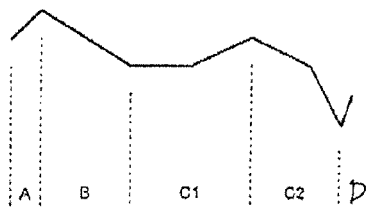

FIG. 1c schematically shows the course of the resonance frequency f of an electrical resonant circuit of a corona discharge device with more greatly delayed ignition, for example with a poorly ignitable mixture. In the regions A, B and a starting region of C1, substantially the same course as with FIG. 1b is shown. In an end region of C1, there is then a temporary rise in the frequency. Only in the region C2 is there then an increasingly rapid fall in the frequency and ultimately ignition of the fuel/air mixture.

Figure 2C:
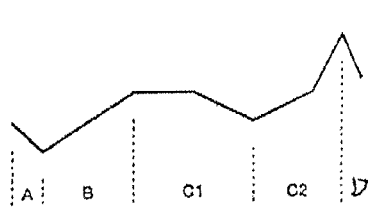

The course of the resonance frequency f in FIG. 1c therefore has two additional extrema, namely an additional minimum at the start of C1 and an additional maximum between C1 and C2. The course illustrated in FIG. 2c of the impedance Z of the electrical resonant circuit at the corona discharge device accordingly likewise shows two additional extrema with very slow ignition.

Figure 3:
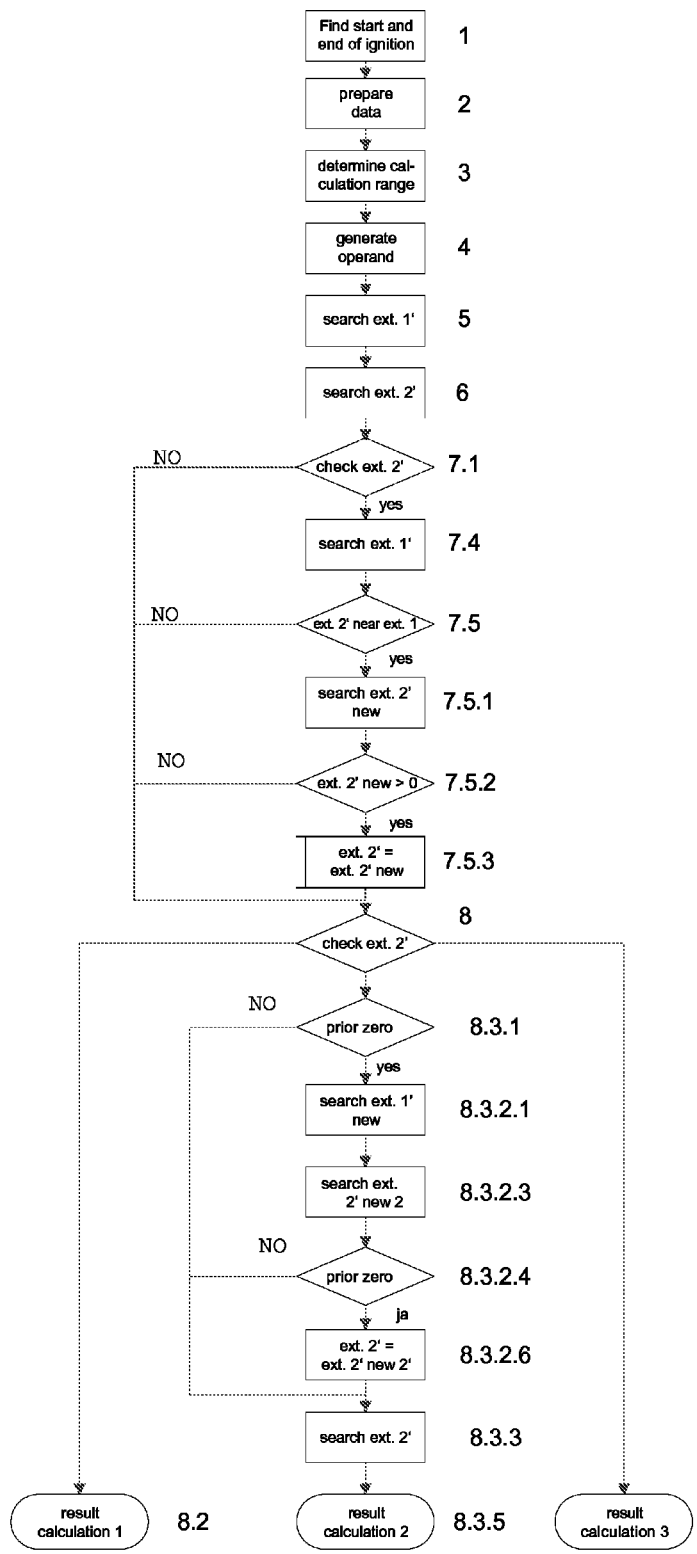
FIG. 3 shows a flow diagram of an exemplary embodiment of a method according to this disclosure for establishing the start of combustion.

FIG. 3 shows a flow diagram of an embodiment of a method for establishing the start of combustion with a cyclically operating internal combustion engine.

At the start of the method, the start and end of a relevant time interval in which the occurrence of a knocking combustion is then sought is determined in a step 1, or at least one preselection is made. For example, the start of the corona discharge and also the end of the fuel combustion can be established from a voltage signal, a current signal and/or another electrical variable. It is also possible for the start and end of the time interval that is to be examined to be predefined by an engine control unit.

As step 2, a preparation of raw data can be performed, for example intermediate values of measured values of an electrical variable of the resonant circuit of the corona discharge device can be established by interpolation. In step 2, a measurement signal can be filtered, for example using a low-pass filter. Depending on whether voltage signals and/or current signals are to be transferred as RMS (root mean square) values or as raw data, different threshold values for low-pass filtering are expedient. When transferring RMS values, a threshold frequency from 1 kilohertz to 500 kilohertz may be expedient for example. When transferring high-frequency raw data, low-pass filtering with a threshold value in the region of 1 megahertz to 20 megahertz may be advantageous for example. Characteristic variables of the resonant circuit, such as the resonance frequency or impedance thereof, can be calculated in step 2, for example from voltage raw data and current raw data via zero-point finding or by transformations. It is also possible, however, for such characteristic variables of the resonant circuit to already be present at the start of the method.

In a step 3, a calculation range for the method can be determined. The start of this range may be the time at which the course of the electrical variable, for example resonance frequency, impedance or phase position between current and voltage, has a first extremum. The start of the range to be examined can also be selected to be somewhat later however, since the start of the corona discharge is characterised by an increased intensity and frequency of disturbing signals. For example, the start can be determined by adding a fixed, predefined time span, in particular of a crankshaft angle, to the moment in time or crankshaft angle of the first extremum. The disconnection of the corona discharge or a predefined crankshaft angle, for example the top dead center, can be used as the end of this range. The end of this range can also be predefined for example by a threshold value for the electrical variable or a change to the electrical variable, For example, with a rise in the frequency from a reached minimum value by at least 1 kHz, preferably at least 2 kHz, it can generally be assumed that the fuel/air mixture ignites and consequently that the further course of the frequency is not required for identifying of the start of combustion. A threshold value, for example 0.2 ohm, can accordingly also be predefined for a change in the impedance after reaching a maximum, and ignition of the fuel/air mixture can be assumed with a fall of the impedance from the reached maximum value by the threshold value. Specific numerical values of course depend on the design of the corona discharge device used and therefore cannot be specified easily in a general manner.

In a subsequent step 4, an operand is generated from the measured electrical variable, for example frequency, impedance or phase position between current and voltage. The operand is preferably the first time derivative of the measured electrical variable, but can also be a difference from a reference variable for example.

In a step 5, a first extremum of the operand is then sought, as is a second extremum of the operand in step 6.

In a step 7.1, it is then checked whether the second extremum of the operand, that is to say for example the second extremum of the derivative, is valid in the examined range. The examined range preferably starts in the region B in FIGS. 1 and 2. With an ideal course, as is illustrated in FIGS. 1a and 2a, the start of combustion lies between the first extremum of the derivative, which is a minimum, and the second extremum of the derivative, which is a maximum. With a course according to FIGS. 1b, 1c and 2b or 2c, additional extrema of the derivative occur however, and therefore the second extremum of the derivative lies before the start of combustion. Such cases are to be identified in step 7.1. To this end, it is checked whether the second extremum lies in an expected time window, which has been established from empirical values or from data collected from previous working cycles.

If it is determined, as a result of step 7.1, that the second extremum of the derivative lies too early, the first extremum of the electrical variable in the determined range is sought in a step 7.4. In the illustrated embodiment, the calculation range was determined in step 3, such that the first extremum lies between the regions A and B in FIGS. 1 and 2. In a step 7.5, it is then checked whether the second extremum of the derivative holds a predefined minimum interval from this first maximum of the electrical variable, for example frequency.

If the second extremum of the derivative is too close to the first extremum of the electrical variable considered, a further, later extremum of the derivative is sought in a step 7.5.1. In a step 7.5.2, it is then checked whether this later extremum has the correct sign. The sign that is correct depends on which electrical variable is considered. If the resonance frequency for example is considered as the electrical variable, a minimum marks the start of combustion, and therefore the preceding extremum of the derivative likewise must be a minimum, that is to say a negative sign is the correct sign. If, by contrast, the impedance is considered as the electrical variable, the start of combustion is associated with a maximum, and therefore the preceding extremum of the derivative is likewise a maximum and consequently has a positive sign, that is to say is greater than zero.

If, in step 7.5.2, the incorrect sign is found, a further, later extremum of the derivative is sought in a step 7.5.3.

In a step 8, which can also be reached directly from steps 7.1, 7.5 and 7.5.2 with a corresponding result, the value of this extremum of the second derivative is then examined.

If its value lies above a predefined threshold value, a value between this extremum of the derivative and the first extremum of the derivative, for example an average value between the times of these two extrema, is assigned to the start of combustion in a step 8.2. Alternatively, a value for the start of combustion can also be provided as an intersection point or by reaching a predefined difference of the two electrical variables from their value at the extrema of their derivative. Step 8.2 is thus used when the derivative before and after the extremum of the electrical variable, which is caused by the start of combustion, is steep. In this case, the extremum of the electrical variable is clearly pronounced.

If the value of the extremum of the derivative considered in step 8 lies below a predefined threshold value, the extremum is only weakly pronounced, and it is therefore checked in a step 8.3.1 whether an earlier extremum has the same value. If this is the case, an error is assumed and a later value of the extremum of the derivative is therefore sought in a step 8.3.2.1, and the first extremum of the considered electrical variable is also newly determined in a step 8.3.2.3, that is to say a later extremum is sought. It is then checked in a step 8.3.2.4, similarly to step 7.5.2, whether this extremum of the derivative has the correct sign and, if not, the search is continued. In a step 8.3.2.6, a last found extremum of the derivative is then determined as a "second" extremum of the derivative for the subsequent calculation of the combustion start. In a step 8.3.3, which can also be reached directly from steps 8.3.1 or 8.3.2.4 with a corresponding result, a second extremum of the considered electrical variable between the valid extrema of the derivative is sought. In step 8.3.5, a value between the second extremum of the electrical variable and the preceding extremum of the derivative is then assigned to the start of combustion, for example by means of averaging, intersection point or the fact that a predefined difference is reached.

The threshold values that lead from step 8 to the calculations 8.2 and 8.3.5 may match. The threshold values are preferably different threshold values however. If, in step 8, it is determined that the value of the considered extremum of the derivative lies between these two threshold values, the start of combustion is assigned to the moment in time of this extremum of the derivative in the embodiment shown.

While exemplary embodiments have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for detecting the start of combustion in a cyclically operating internal combustion engine in which a fuel/air mixture is ignited by means of a corona discharge, comprising:
    generating a corona discharge by exciting an electrical resonant circuit in which an ignition electrode, which is electrically isolated from the combustion chamber walls, and the combustion chamber walls constitute a capacitor;
    evaluating an electrical variable of the resonant circuit to identify the start of combustion; and
    evaluating the position of an extremum occurring in the course of the electrical variable after ignition of the corona discharge and before extinguishment thereof;
    wherein a first extremum in the course of the electrical variable is assigned to the start of the corona discharge and further extrema are sought in order to establish the start of combustion.

2. The method according to claim 1, wherein the electrical variable is the resonance frequency of the resonant circuit, the impedance of the resonant circuit or the phase position between current and voltage.

3. The method according to claim 1, wherein a threshold value is predefined and the course of the electrical variable is evaluated, the evaluation being limited to a value range between the first extremum and the point at which the threshold value is reached.

4. The method according to claim 1, wherein when a plurality of extrema occur after the ignition of the corona discharge, the method comprises further evaluating whether said extrema are within a predefined minimum interval from the start of the corona discharge, further wherein, extrema that are outside said predefined minimum interval remain unconsidered in the further evaluation.

5. The method according to claim 1, wherein when a plurality of extrema occur between the start of the corona discharge and the extinguishment thereof, the start of combustion is assigned to the extremum that is more strongly pronounced than the other extrema in the examined range.

6. The method according to claim 1, wherein a time derivative of the electrical variable is established and extrema are sought in the course of the time derivative, wherein when a plurality of extrema occur in the course of the electrical variable between the ignition of the corona discharge and the extinguishment thereof, the start of combustion is assigned to the extremum of the electrical variable that follows an extremum of the derivative that is more strongly pronounced than extrema of the derivative followed by the other extrema of the electrical variable in the examined range.

7. The method according to claim 1, wherein when a plurality of extrema occur, one extremum is assigned to the start of combustion by considering both the value of the one extremum and the value of a preceding extremum of the first derivative of the electrical variable.

8. The method according to claim 1, wherein a threshold value for a change to the electrical variable once an extreme value is reached is predefined, and the course of the electrical variable is only evaluated up to the point where the electrical variable has changed by the threshold value, starting from an extreme value.

9. The method according to claim 1, wherein an average value of the start of combustion is calculated for a number of cycles of the internal combustion engine.

10. The method according to claim 9, wherein the average value of the start of combustion is used to determine a range in which the extremum is sought, the position of which is evaluated in order to establish the start of combustion.

11. A method for detecting the start of combustion in a cyclically operating internal combustion engine in which a fuel/air mixture is ignited by means of a corona discharge, comprising:
   generating a corona discharge by exciting an electrical resonant circuit in which an ignition electrode, which is electrically isolated from the combustion chamber walls, and the combustion chamber walls constitute a capacitor;
   evaluating an electrical variable of the resonant circuit to identify the start of combustion; and
   evaluating the position of an extremum occurring in the course of the electrical variable after ignition of the corona discharge and before extinguishment thereof;
   wherein when a plurality of extrema occur after the ignition of the corona discharge, the method comprises further evaluating whether said extrema are within a predefined minimum interval from the start of the corona discharge, further wherein, extrema that are outside said predefined minimum interval remain unconsidered in the further evaluation.

12. A method for detecting the start of combustion in a cyclically operating internal combustion engine in which a fuel/air mixture is ignited by means of a corona discharge, comprising:
   generating a corona discharge by exciting an electrical resonant circuit in which an ignition electrode, which is electrically isolated from the combustion chamber walls, and the combustion chamber walls constitute a capacitor;
   evaluating an electrical variable of the resonant circuit to identify the start of combustion; and
   evaluating the position of an extremum occurring in the course of the electrical variable after ignition of the corona discharge and before extinguishment thereof;
   wherein when a plurality of extrema occur between the start of the corona discharge and the extinguishment thereof, the start of combustion is assigned to the extremum that is more strongly pronounced than the other extrema in the examined range.

* * * * *